United States Patent
Bharadwaj et al.

(10) Patent No.: US 7,792,966 B2
(45) Date of Patent: Sep. 7, 2010

(54) ZONE CONTROL WEIGHTS

(75) Inventors: Sunil Bharadwaj, Portland, OR (US); Michael Fiedler, Mainz (DE); Xin Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 11/768,311

(22) Filed: Jun. 26, 2007

(65) Prior Publication Data

US 2009/0006501 A1    Jan. 1, 2009

(51) Int. Cl.
*G06F 15/173* (2006.01)
*G06F 15/177* (2006.01)

(52) U.S. Cl. ........................... 709/226; 709/220
(58) Field of Classification Search .................. None
See application file for complete search history.

(56) References Cited

U.S. PATENT DOCUMENTS

| | | | |
|---|---|---|---|
| 6,195,218 B1 | 2/2001 | Guttmann et al. | |
| 6,260,062 B1 * | 7/2001 | Davis et al. | 709/223 |
| 6,745,207 B2 * | 6/2004 | Reuter et al. | 707/200 |
| 7,051,101 B1 | 5/2006 | Dubrovsky et al. | |
| 2004/0243699 A1 * | 12/2004 | Koclanes et al. | 709/224 |
| 2005/0256946 A1 * | 11/2005 | Childress et al. | 709/223 |
| 2008/0162681 A1 * | 7/2008 | Yellapragada et al. | 709/223 |

FOREIGN PATENT DOCUMENTS

WO    0055750 A1    9/2000

* cited by examiner

*Primary Examiner*—John B. Walsh
(74) *Attorney, Agent, or Firm*—Lieberman & Brandsdorfer, LLC

(57) ABSTRACT

A method and apparatus are provided for performing zone entity modifications to entities in a network wherein a set of generic zone entity modification commands with an estimated lower processing cost is selected for each modification. Prior zone entity modifications in the network and the associated quantity of entities and processing time associated therewith are stored in a data structure. In response to a zone entity modification request, data associated with the current request is evaluated in view of processing time for prior zone entity modifications. An estimate of processing time for the zone entity modification request is calculated for at least two sets of generic zone entity modification commands. The set of generic commands with an estimated lower processing cost is selected and applied to the current zone entity modification request.

16 Claims, 5 Drawing Sheets

| Operation | Benchmark Weight (Processing Cost) |
|---|---|
| Create Entity | $W_{Create\ Entity}$ |
| Delete Entity | $W_{Delete\ Entity}$ |
| Add Entity to Entity | $W_{Add\ Entity\ to\ Entity}$ |
| Remove Entity from Entity | $W_{Remove\ Entity\ from\ Entity}$ |

| Operation | Benchmark Weight (Processing Cost) |
|---|---|
| Create Entity | $W_{\text{Create Entity}}$ |
| Delete Entity | $W_{\text{Delete Entity}}$ |
| Add Entity to Entity | $W_{\text{Add Entity to Entity}}$ |
| Remove Entity from Entity | $W_{\text{Remove Entity from Entity}}$ |

FIG. 1

ZONE CONTROL WEIGHTS

BACKGROUND OF THE INVENTION

1. Technical Field

This invention relates to a network of integrated processors and storage media, and fabric zoning in the network. More specifically, the invention relates to efficiently modifying one or more zone entities in the network.

2. Description of the Prior Art

A Storage Area Network (SAN) is a network whose primary purpose is the transfer of data between computer systems and storage elements and among storage elements. In one embodiment, a SAN is used for system interconnection in clusters. A SAN consists of a communication infrastructure, which provides physical connections, and a management layer, which organizes the connections, storage elements, and computer systems so that data transfer is secure and robust. The term SAN is usually (but not necessarily) identified with block I/O services rather than file access services. One or more inter-connectivity devices, such as high speed data switches, interconnect the various data storage systems to each other and to one or more servers that require access to the data in the data storage systems. As servers access the data, the data switches channel the data access requests to the appropriate data storage systems within the storage network. Each data switch includes one or more ports dedicated to transferring data to and/or from a data storage system or server.

A zone of resources within a storage network or another form of distributed computer network is an association, relation, or grouping of resources that are arranged according to function and/or location. Zones provide a mechanism to increase network security and prevent data loss or corruption by controlling access between devices or user groups. Resources within the same zone can access each other, while resources in different zones cannot access each other. For example, in one embodiment zoning is a method of subdividing a SAN into subsets of nodes, i.e. zones, on the network where SAN nodes outside of a zone are invisible to nodes within the zone. Zones are generally used to create the following: barriers between devices that use different operating system, logical subsets of closed user groups, groups of devices that are separate from devices in the rest of a fabric, or temporary access between devices for specific purposes. A server in the network, also known as the fabric zone server, may be used to create a zone by specifying zone members. Zero or more zones may be collected into a zoneset, and a zone may be a member of more than one zoneset. A zoneset creates a collection of zones that may be activated or deactivated as a single entity across all switches in the SAN fabric. However, only one zoneset may be active for a fabric at a particular point of time. An alias is a named collection of zone members, and the members of the alias may be part of other aliases. The zoneset can contain zero or more zones.

With respect to zoning, the data switch is generally responsible for zone enforcement. Ports that are members of a zone can communicate with each other but are isolated from ports in other zones. Devices, however, can belong to more than one zone. Using zoning, you can automatically or dynamically arrange connected devices into logical groups or zones across the physical fabric or network.

Zoning for a fabric consists of a zone definition and an active configuration. Active configuration enforces the zoning in a fabric. A zone definition is a collection of zone entities that have a hierarchical relationship amongst them, with a zone entity referring to a zone set, a zone, or an alias. The zone definition can consist of zero or more zonesets with each zoneset containing zero or more zones. Each zone can contain zero or more zone aliases and zero or more zone members. A zone alias can contain zero or more zone members. An alias is a named collection of zone members. Both the zone and the zone alias contain zero or more members, but there are difference between the zone and zone alias. For example, an alias does not exist in the active copy of an active zone set. Its members are imploded and represented as direct descendents of the zone containing alias. In addition, the zone definition can contain zero or more zones that do not belong to any zonesets and zero or more zone aliases that do not belong to any zone. An active configuration can contain an active zoneset or no active zonesets. The active zoneset can contain zero or more zones with each zone containing zero or more zone aliases and zero or more zone members and with each zone alias in a zone containing zero or more zone members. In an active configuration there cannot be a zone that does not belong to a zoneset or an alias that does not belong to a zone entity since there is one common ancestor in an active configuration which is the active zone set. There can be a zone set with same name in both the zone definition and active configuration and it can have the same or different contents. Sometimes those copies are referred to as active and inactive copies of the zoneset. A zone member has to always belong to either a zone entity or zone alias and cannot exist as a standalone entity.

Hereinafter, the terms zone, zoneset and zone alias will be referred to as a zone entity. A zoneset in an active configuration can be created, deleted or modified. In addition a zoneset can be activated and deactivated. Activation propagates a zoneset to the active configuration. Conversely, deactivation removes the zoneset from the active configuration.

A modification of a zone entity could mean addition to a zone entity or entities, and removal from a zone entity or entities. Removal from a zone entity is different from deleting a zone entity. Removal from a zone entity involves removing that entity from been part of the specified zone entity. The zone entity can still be part of other zone entities or not a part of any zone entity. Deletion of a zone entity means its removal from zone definition and/or active zone configuration and the zone entity no longer exists in zone definition and/or active zone configuration.

When making changes to zone entities in a fabric there are two approaches. The first approach is to delete the entire zone entity and recreate it with the desired definition. This first approach is known in the art as a non-incremental approach. The second approach is to modify the zone entity by adding or removing one or more zone entities to and/or from a zone entity to reflect the new definition. This second approach is known in the art as an incremental approach. Depending on the size of a zone entity and the number of changes to be made to the zone entity, one approach may be more efficient that the other approach. Selection of an approach that is not optimal, may lead to inefficient performance.

Accordingly, there is a need for a tool that dynamically selects an optimal modification approach, i.e. incremental or non-incremental, that should be used to modify each zone entity. The tool should select an optimal approach depending on the current constitution of the zone entity and the extent to which the zone entity needs to be modified.

SUMMARY OF THE INVENTION

This invention comprises a method and system to manage zone entity modifications in a network, and more specifically, to determine an optimal zone entity modification approach based upon a cost analysis.

In one aspect of the invention, a method is provided for operating a network. The method includes expressing one set of zone entity modification commands of the network as a first cost, and expressing a second set of zone entity modification commands of the network as a second cost. The first and second sets of zone entity modification commands are equivalent in achieving the same result for the zone entity modification. It is determined which of the first and second sets of zone entity modification commands has a lower estimated cost. Based on this determination, the set of zone entity modification commands with the lower cost is selected. Thereafter, the zone population of the network is amended with zone entity modification commands associated with the selected lower cost.

In another aspect of the invention, a computer system is provided with a processor in communication with a network of processing units and storage media. In the network, an arrangement of grouping of resources is provided. A first set of zone entity modification commands to the arrangement is expressed as a first cost. Similarly, a second set of zone entity modification commands to the arrangement is expressed as a second cost. The first and second sets of zone entity modification commands are equivalent in achieving the same result for the zone entity modification. A selection manager is provided to determine which of the sets of zone entity modification commands has a lower cost. The selection manager selects the set of zone entity modification commands with the lower cost, and a zone manager amends a zone entity population in the network with the set of zone entity modification commands associated with the lower cost.

In yet another aspect of the invention, an article is provided with a tangible computer readable carrier including computer program instructions configured to cause a computer to detect a zone modification request in a network, and computer program instructions to manage a zone entity modification request. Instructions are provided to express a first set of zone entity modification commands of the network as a first cost. Similarly, instructions are provided to express a second set of zone entity modification commands of the network as a second cost. Both the first and second sets of zone entity modification commands are equivalent in achieving the same result for the zone entity modification. Instructions are also provided to determine which of the sets of commands has a lower estimated cost. In response to the determination, instructions are provided to select the set of zone entity modification commands with the estimated lower cost and to amend a zone population of the network with the zone entity modification commands associated with the selected lower cost.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a block diagram of a data structure.

DESCRIPTION OF THE PREFERRED EMBODIMENT

Overview

Figure 2A:
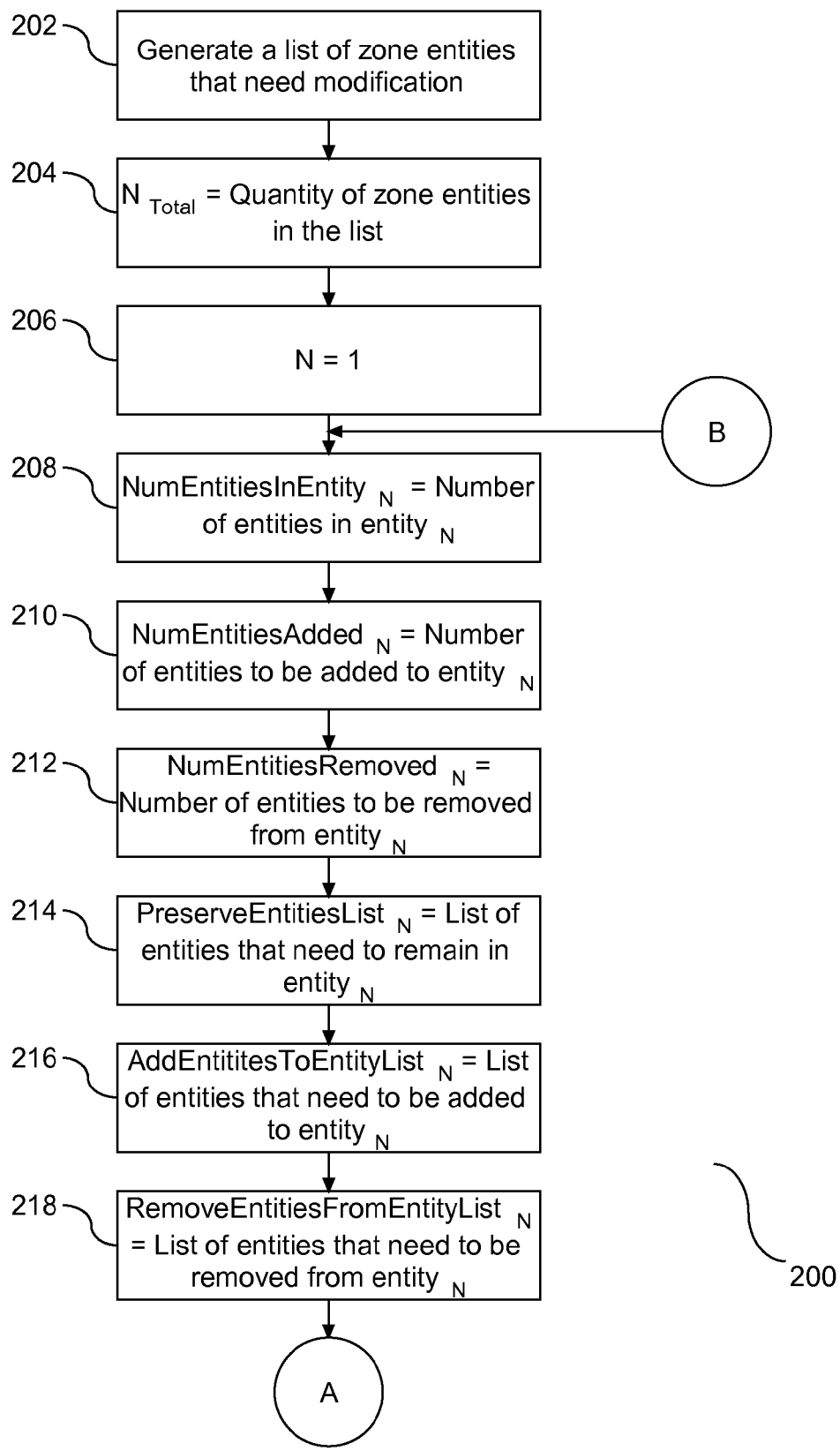
FIGS. 2A and 2B are a flow chart illustrating a process for evaluating costs associated with a zone entity modification, according to the preferred embodiment of this invention, and is suggested for printing on the first page of the issued patent.

Create and delete sets of zone entity modification commands are similar to add and remove sets of zone entity modification commands for zone entity configuration. Although these commands are similar and may reach the same end result, there may be different costs associated with use of each set of commands. In one embodiment, costs may be interpreted as processing time. For example, when updating a specific zone set, there is one cost for use of one set of commands to reach the desired result, and another cost for use of an alternative yet equivalent set of commands which reach the same result. Each set of commands and their associated costs can be expressed with an algorithm. Based on a calculated cost, an optimal set of commands may be selected for use in a particular zone entity modification.

TECHNICAL DETAILS

In operating a network of interconnected processing units and/or a storage network with zoning of ports and logical volumes, it is known in the art that modifications to the zone entity may be required to maintain communication among the members of different zone entities. A zone entity is used herein to refer to a zone set, a zone, or a zone alias. Zoning entity modification takes place with one of two sets of commands. The first set of commands is defined as a set of non-incremental commands to modify a zone entity. The non-incremental set of commands includes deleting the zone entity and recreating the zone entity with the desired definition. The second set of commands is defined as a set of incremental commands to modify a zone entity. The incremental set of commands includes adding or removing zone entities from the existing definition, i.e. incremental. A file is maintained to track the historical processing time associated with individual commands used in both zone entity modification approaches. More specifically, the file maintains a record of the duration required for processing a specific zone entity modification. In one embodiment, the file is in the form of a data structure to track zone usage and modification over time.

FIG. 1 is a sample data structure (100) associated with tracking costs associated with zone entity modifications. As shown, there are two fields. Each of the fields reflects a calculated constant associated with processing time for the specified zone entity modification. In one embodiment, the cost may reflect an alternate factor associated with a zone entity modification and not processing time. The first field (102) identifies the specific zone entity modification, also known as the operation. For example, as shown herein, there are four categories of zone entity modifications—create a new zone entity (112), delete existing zone entity (114), add a zone entity to a zone entity (116), and remove a zone entity from a zone entity (118). Each zone entity modification (112)-(118) has a cost associated therewith. As shown herein, the cost is shown in the second field (104) and associates a cost to process each entity for each category of a zone entity modification. In the example shown herein, the cost for creating a new zone entity is shown at (122) and is assigned the variable $W_{CreateEntity}$, the cost for deleting existing zone entity is shown at (124) and is assigned the variable $W_{DeleteEntity}$, the cost for adding a zone entity to a zone entity is shown at (126) and is assigned the variable $W_{AddEntityToEntity}$, and the cost for removing a zone entity from a zone entity is shown at (128) and is assigned the variable $W_{RemoveEntityFromEntity}$. With the exception of fields (122) and (124), each of the costs are on a per zone entity member basis, meaning that the cost is associated with each zone entity that is added or removed from a zone entity. Fields (122) and (124) are associated with creation and deletion of zone entity for which an optimal modification method is to be determined. Accordingly, the data structure shown herein is an example of associating a processing cost with a zone entity modification technique.

The cost measurement associated with a zone entity modification may be measured based on historical data. For example, the cost measurement may be based on historical processing time for prior zone entity modifications. The operation time for each individual zone entity control command, e.g. creating and deleting a zone entity and adding and removing a number of entities to a zone entity, is benchmarked based on previous operations. A variable associated with the processing time for each command may be calculated and maintained in an associated data structure. The cost(s) associated with the above-identified modification selections are dynamic in that they may change over time. Accordingly, for each zone entity modification, the processing time is measured in conjunction with the number of entities in the entity or number of entities to be added or removed from the entity subject to the modification.

Figure 2B:
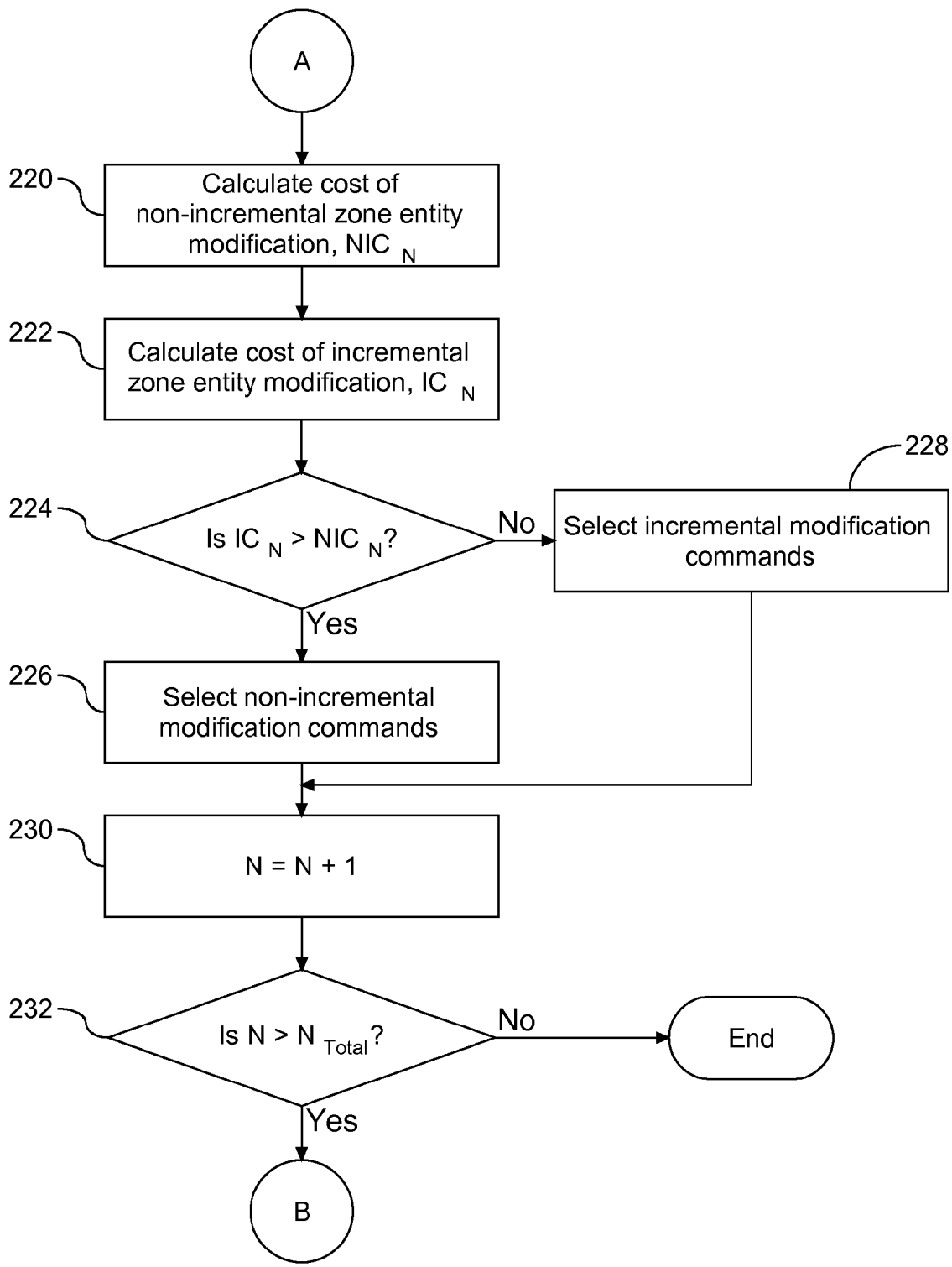

FIGS. 2A and 2B are a flow chart (200) illustrating a process for evaluating costs associated with a zone entity modification. Initially, a list of zone entities that need a modification is generated (202). The variable $N_{Total}$ (204) is assigned to the quantity of zone entities identified at step (202), and the variable N is assigned to the integer 1 (206). For zone entity$_N$, the number of entities in entity$_N$ is determined and assigned to the variable NumEntitiesInEntity$_N$ (208). Similarly, the number of entities to be added to entity$_N$ is determined and assigned to the variable NumEntitiesAdded$_N$ (210), and the number of entities to be removed from entity$_N$ is determined and assigned to the variable NumEntitiesRemoved$_N$ (212). Following step (212), a list of entities that need to remain in entity$_N$ is generated and assigned to the variable PreserveEntitiesList$_N$ (214). Similarly, a list of entities that need to be added to entity$_N$ is generated and assigned to the variable AddEntitiesToEntityList$_N$ (216), and a list of entities that need to be removed from entity$_N$ is generated and assigned to the variable RemoveEntitiesFromEntityList$_N$ (218). Following the generation of lists at steps (214)-(218), a non-incremental zone entity modification cost is calculated and assigned to the variable NIC$_N$ (220), and an incremental zone entity modification cost is calculated and assigned to the variable IC$_N$ (222). The algorithm for calculating both the incremental and non-incremental zone entity modification is described in detail below. Following the computations at step (220) and (222), a determination is conducted as to whether the incremental zone entity modification IC$_N$ has a greater cost than the non-incremental zone entity modification, NIC$_N$ (224). In one embodiment, the determination at step (224) may be whether the non-incremental zone entity modification NIC$_N$ has a greater cost than the incremental zone entity modification IC$_N$. Regardless of the format of the determination at step (224), the test is to determine which modification process has a greater projected cost. If it is determined at step (224) that the incremental zone entity modification IC$_N$ has a greater projected cost, the non-incremental zone entity modification NIC$_N$ is selected (226). Similarly, if it is determined at step (224) that the non-incremental zone entity modification NIC$_N$ has a greater projected cost, the incremental zone entity modification IC$_N$ is selected (228). Following steps (226) or (228) the variable N is incremented (230), followed by determination as to whether there are any more zone entities that need modification (232). In one embodiment, the variable N is compared with $N_{Total}$, if $N_{Total}$ is larger than variable N, then additional zone entities need to be modified. If the variable N is larger than $N_{Total}$, then no more zone entity needs modification. If it is determined at step (232) that no more zone entity needs to be modified, the process is complete. However, if it is determined in step (232) that additional zone entities need to be modified, the process returns to step (208) for the next identified zone entity that needs modification. Accordingly, each zone entity identified for modification is evaluated to determine which approach is more efficient.

The flow chart illustrated above demonstrates how to select an optimal set of commands for a zone entity modification based upon cost predictions. One network may have one zone entity or a plurality of zone entities. The calculations demonstrated above may be applied separately to each zone entity in the network, i.e. on a per zone entity basis.

Figure 3:
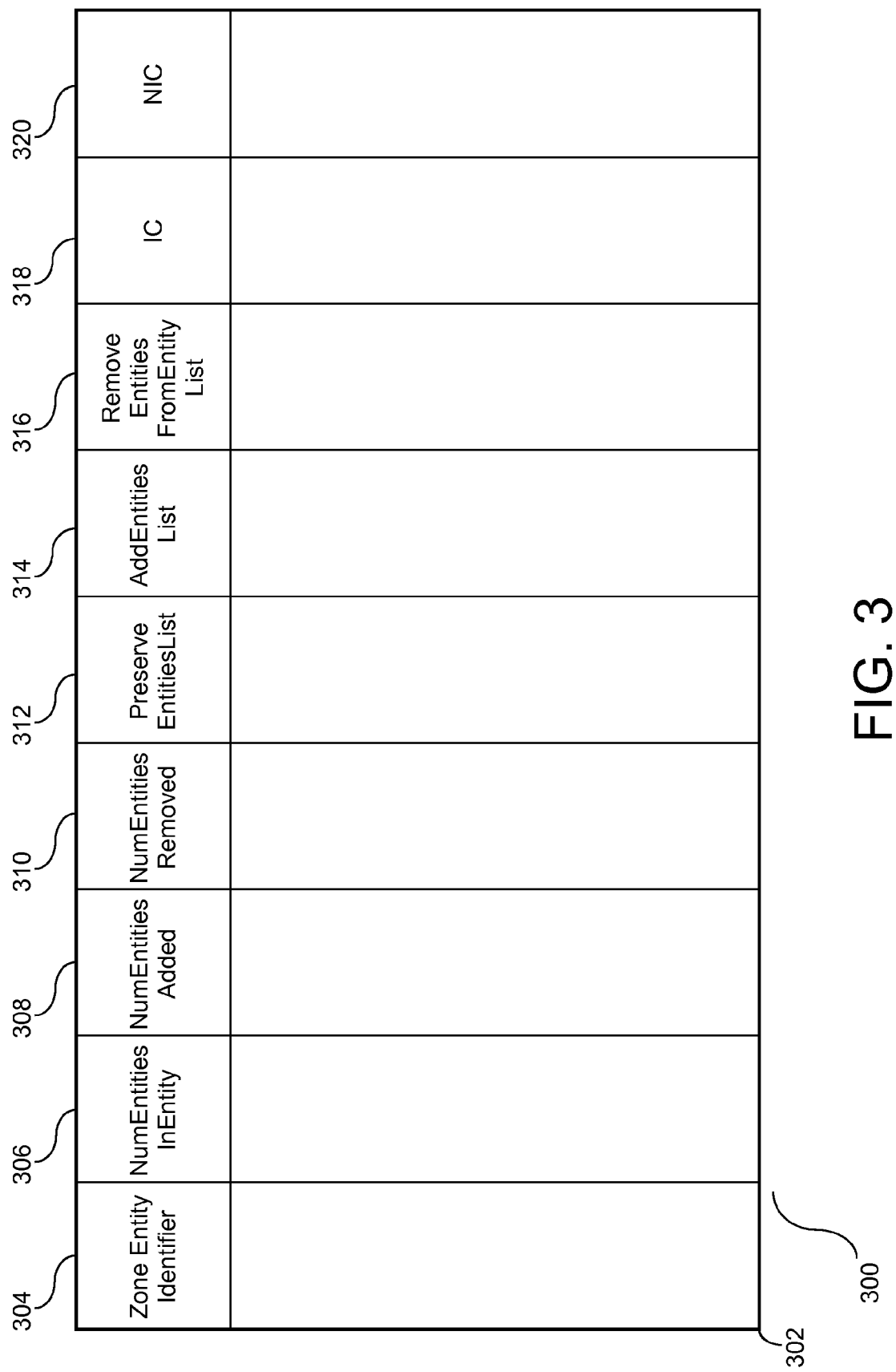
FIG. 3 is a block diagram of a sample table s generated and maintained to organize the data acquired in FIGS. 2A and 2B.

As demonstrated in FIGS. 2A and 2B, specific data is solicited for each zone entity subject to a modification. More specifically, for each zone entity subject to modification the following data is assessed: the number of entities in the entity, the number of entities to be added to the entity, the number of entities to be removed from the entity, the list of entities that need to remain in the entity, the list of entities that need to be added, and the list of entities that need to be removed. FIG. 3 is a block diagram (300) of a sample table (302) that is generated and internally maintained to organize the data acquired with prior zone entity modifications in FIGS. 2A and 2B. In one embodiment, the table (302) is stored in transient memory. As shown, the table (302) includes nine fields. The first field (304) associates an identifier for the zone entity subject to modification. The second field (306) identifies the number of entities in the zone entity, as determined at step (208). The third field (308) identifies the number of zone entities to be added to the zone entity, as determined at step (210). The fourth field (310) identifies the number of zone entities subject to be removed from the subject zone entity, as determined at step (212). The fifth field (312) identifies the list generated of the entities that need to remain in the entity in the desired definition, as determined at step (214). The sixth field (314) identifies the list generated of the entities that need to be added to the zone entity, as determined at step (216). The seventh field (316) identifies the list generated of the entities that need to be removed from the zone entity, as determined at step (218). In addition to the fields associated with the zone entity specificities, the table may also include the projected non-incremental cost (318), NIC, and the projected incremental cost (320), IC. Accordingly, the data ascertained for each zone entity subject to a modification is maintained in an internal table or data structure.

Each zone modification has a processing cost associated with the modification. As shown above, the cost is calculated based upon the specificity of the individual zone modification. A cost analysis is conducted to determine an optimal zone entity modification in view of the time required for the operation. The following is a mathematical formula used to calculate the costs associated with a zone entity modification using an incremental command modification, IC:

$$IC = (W_{AddEntityToEntity} * \text{NumEntitiesAdded}) + (W_{RemoveEntityFromEntity} * \text{NumEntitiesRemoved})$$

The values for both $W_{AddEntityToEntity}$ and $W_{RemoveEntityFromEntity}$ are found in the data structure shown in FIG. 1, and the values for NumEntitiesAdded and NumEntitiesRemoved are determined based upon the algorithm shown in FIGS. 2A and 2B.

Similarly, the following is a mathematical formula used to calculate the costs associated with a zone entity modification using a non-incremental command modification, NIC:

$$NIC = W_{DeleteEntity} + W_{CreateEntity} + (W_{AddEntityToEntity} \\ (\text{NumEntitiesInEntity} - \text{NumEntitiesRemoved} + \text{NumEntitiesAdded}))$$

Accordingly, as demonstrated above, a set of generic commands are selected based upon a cost analysis comparison.

Based upon the data gathered for assessing projected costs for a zone modification, a more detailed definition of a non-incremental set of commands and an incremental set of commands is defined. A non-incremental set of commands to modify a zone entity may involve the following sequence of commands:
1. Delete current definition of zone entity using DeleteEntity command;
2. Create entity using CreateEntity command; and
3. For each entity that needs to remain in the entity, i.e. for each entity in PreserveEntitiesList, and for each entity that needs to be added to the entity, i.e. for each entity in the AddEntitiesToList, add that entity to the entity created using AddEntityToEntity command.

Similarly, an incremental set of commands to modify a zone entity may involve the following sequence of commands:
1. For each entity in the list of entities that need to be added, i.e. for each entity in the AddEntitiesToEntity list, add the entity to the entity identified as subject to modification using AddEntityToEntity command; and
2. For each entity in the list of entities that need to be removed, i.e. for each entity in the RemoveEntitiesFromEntity list, remove the entity from the entity subject to modification using RemoveEntityFromEntity command Accordingly, the data gathered for each entity subject to a zone modification and stored in an internal table is utilized in association with commands to modify the zone entity.

In one embodiment, the invention is implemented in software, which includes but is not limited to firmware, resident software, microcode, etc. The invention can take the form of a computer program product accessible from a computer-useable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instructions execution system, apparatus, or device.

Figure 4:
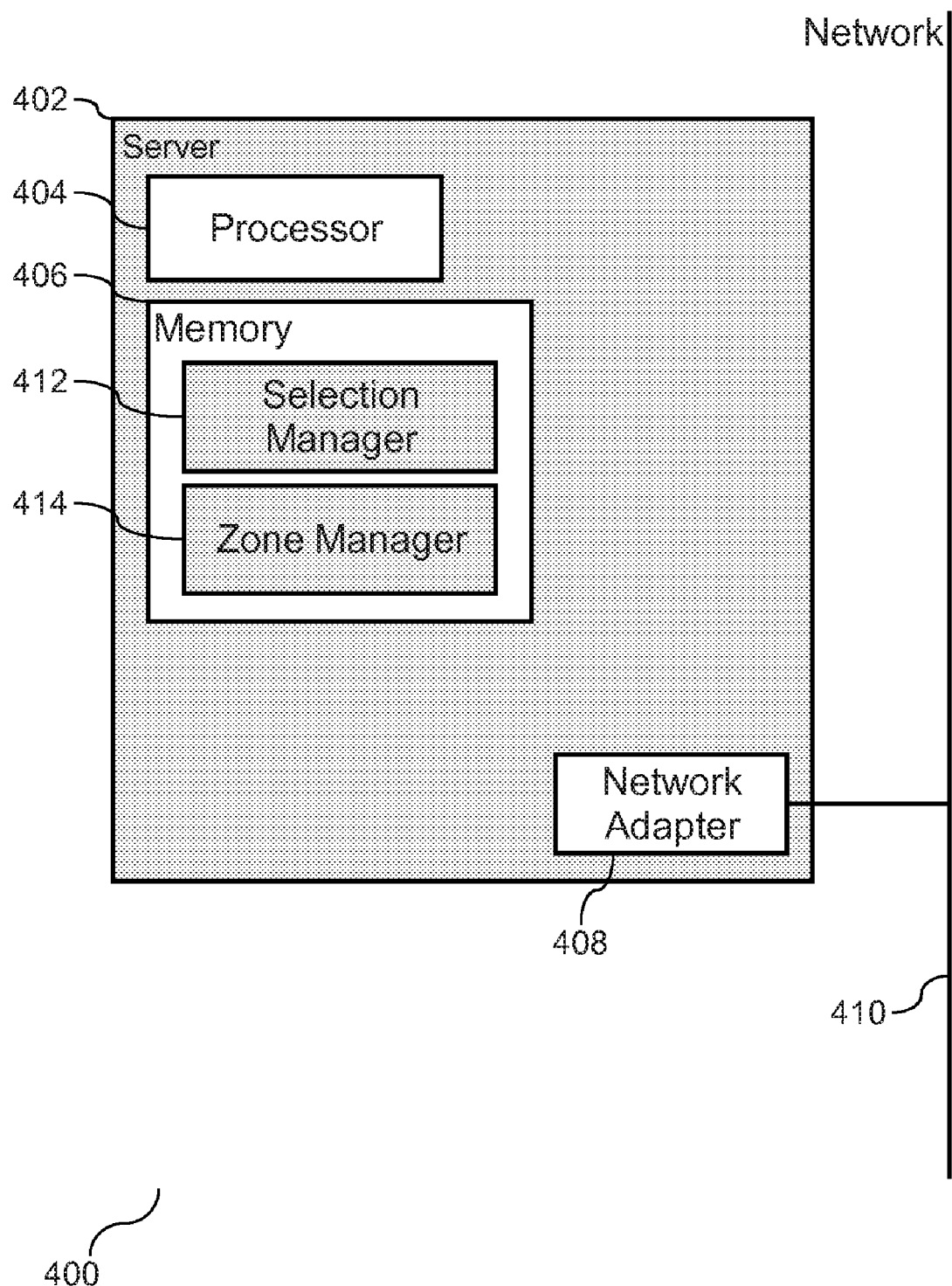
FIG. 4 is a block diagram illustrating placement of one or more zone modification managers in a computer system.

FIG. 4 is a block diagram (400) illustrating placement of a selection manager and a zone entity manager in a computer system. The illustration shows a server (402) with a processor (404), memory (406), and a network adapter (408) in communication with a network (410). In one embodiment, the network is a distributed network of computer servers and clients. Similarly, in one embodiment the network is a storage area network of shared storage media. The server (402) communicates across the network (410). Memory (406) includes a selection manager (412) and a zone entity manager (414). As shown, the selection manager (412) is in communication with the zone entity manager (414). The selection manager (412) is responsible for selection of a set of zone entity modification commands. In one embodiment, the selection is based upon the set of zone entity modification commands with an estimated lower processing cost. The zone entity manager (414) is responsible for amending a zone entity population in the network with the set of zone entity modification commands determined by the selection manager (412) to have an estimated lower cost. Both the selection manager (412) and the zone entity manager (414) are shown residing in memory (406) of the server (402). In one embodiment, the selection manager (412) and the zone entity manager (414) may be implemented as hardware tools external to memory (406). Accordingly, the managers (412) and (414) may be implemented as a software tool, a hardware tool, or a combination of hardware and software tools to facilitate creation and modification of a zone entity in a computer network.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

A data structure is maintained in conjunction with monitoring techniques to dynamically update processing costs associated with the generic commands. Processing time and costs may vary over time based upon a variety of factors. For each zone entity to be modified, selection of the most efficient approach, i.e. incremental or non-incremental approach, results in an optimal zone modification. The selection of the optimal approach depends on both current and desired definition for zone entity and processing time of the equivalent commands needed to perform the updates. In one embodiment, the selection of the optimal approach is done dynamically on a per entity basis. By dynamically maintaining data associated with processing costs, the estimate reflects real-time modifications to entities subject to zoning in the network.

Alternative Embodiments

It will be appreciated that, although specific embodiments of the invention have been described herein for purposes of illustration, various modifications may be made without departing from the spirit and scope of the invention. In particular, in one embodiment, data associated with prior zone entity modifications, including prior processing time and entities associated therewith, may be stored in cache. This reduces latency associated with selection of a set of commands in that it enables the selection manage to select an optimal set of zone entity modification commands in an efficient manner. Accordingly, the scope of protection of this invention is limited only by the following claims and their equivalents.

We claim:

1. A method for operating a network, comprising the steps of:
   configuring said network with a plurality of processing units and storage media, and providing a plurality of resource zones within said network;
   expressing one set of zone entity modification commands of said network for a zone entity as a first cost and expressing a second set of zone entity modification commands of said network for said zone entity as a second cost, wherein said first and second sets of zone entity modification commands are equivalent in achieving same result for said zone entity modification;
   maintaining a processing time estimate for a set of zone entity modification commands, wherein said processing time estimate is based on historical data from at least one prior zone entity modification in said network;
   determining which of said sets of zone entity modification commands has a lower estimated cost for said zone entity; and
   amending a zone entity population of said network with said selected zone entity modification commands associated with said selected lower cost.

2. The method of claim 1, further comprising selecting said zone entity modification commands with said lower cost based on said determination.

3. The method of claim 2, wherein the step of selecting said set of zone entity modification commands with said lower cost occurs dynamically.

4. The method of claim 1, wherein said zone entity includes a zone set, a zone, and a zone alias.

5. The method of claim 1, wherein said first cost includes an incremental zone entity modification technique including processing time data stored in said data structure for adding a first zone entity to a second zone entity and for removing one of said zone entities from another of said zone entities.

6. The method of claim 1, wherein said second cost is a non-incremental zone entity modification including processing time data stored in said data structure for deleting a zone entity, for adding a first zone entity to a second zone entity, and creating a new zone entity.

7. A computer system comprising:
   a processor in communication with a network of processing units and storage media;
   an arrangement of a grouping of resources in said network;
   a first set of modification commands to said arrangement expressed as a first cost, and a second set of modification commands to said arrangement expressed as a second cost, wherein the first and second sets of zone entity modification commands are equivalent in achieving same result for the zone entity modification;
   a data structure to maintain a processing time estimate for said sets of zone entity modification commands, wherein said estimate is based on historical data from at least one prior zone entity modification in said network;
   a selection manager to determine which of said sets of zone entity modification commands has a lower cost; and
   a zone entity manager, in communication with said selection manager, to amend a zone entity population in said network with said set of zone entity modification commands associated with said lower cost.

8. The system of claim 7, wherein said zone entity includes a zone, a zone set, and a zone alias.

9. The system of claim 7, further comprising said selection manager to select said set of zone entity modification commands with said lower cost.

10. The system of claim 9, wherein said selection manager selects one of said sets of zone entity modification commands dynamically.

11. The system of claim 7, wherein said second costs is a non-incremental zone entity modification that includes processing time stored in said data structure to delete a zone entity, to add a first zone entity to a second zone entity, and to create a new zone entity.

12. The system of claim 7, wherein said first cost is an incremental zone entity modification that includes processing time data stored in said data structure to add a first zone entity to a second zone entity and to remove one of said zone entities from another of said zone entities.

13. An article comprising:
   a computer readable data storage medium including computer program instructions configured to cause a computer to detect a zone entity modification request in a network and computer program instructions to manage said zone entity modification request, comprising:
   instructions to express a first set of zone entity modification commands of said network as a first cost and instructions to express a second set of zone entity modification commands of said network as a second cost, wherein the first and second sets of zone entity modification commands are equivalent in achieving same result for the zone entity modification;
   instructions to maintain a processing time estimate for a set of zone entity modifications commands, wherein said estimate is based on historical data from at least one prior zone entity modification in said network;
   instructions to determine which of said sets of commands has a lower estimated cost; and
   instructions to amend a zone entity population of said network with said zone entity modification commands associated with said selected lower cost.

14. The article of claim 13, further comprising an instruction to select said set of zone entity modification commands with said lower cost.

15. The article of claim 14, wherein the instruction to select said set of zone entity modification commands with said lower costs occurs dynamically.

16. The article of claim 13, wherein said first cost is an incremental zone entity modification that includes processing time data from said data structure to add a first zone entity to a second zone entity and to remove one of said zone entities from another of said zone entities, and said second cost is a non-incremental zone entity modification that includes processing time from said data structure to delete a zone entity, to add a first zone entity to a second zone entity, and to create a new zone entity.

\* \* \* \* \*